United States Patent [19]

Schäfer

[11] 4,271,679
[45] Jun. 9, 1981

[54] HEATING INSTALLATION

[76] Inventor: Otmar U. Schäfer, Pienzenauerstrasse 9, 8000 Munich 80, Fed. Rep. of Germany

[21] Appl. No.: 53,285

[22] Filed: Jun. 29, 1979

[30] Foreign Application Priority Data

Jul. 3, 1978 [DE] Fed. Rep. of Germany ....... 2829134

[51] Int. Cl.³ .............................................. F25B 27/02
[52] U.S. Cl. .................................................... 62/238.4
[58] Field of Search ...................................... 62/238 C

[56] References Cited

U.S. PATENT DOCUMENTS

| 3,153,442 | 10/1964 | Silvern | 62/238 C |
| 3,394,555 | 7/1968 | LaFleur | 62/238C |
| 3,400,554 | 9/1968 | Dennis et al. | 62/238 C |
| 4,118,934 | 10/1978 | Brola | 62/238 C |

Primary Examiner—Lloyd L. King

[57] ABSTRACT

A heating installation in which heat from the environment is fed to a consumer by means of a heat pump while the compressor of the heat pump is driven by a turbine which is located in the circuit of a further heat carrier which is heatable by a heat source, the energy of which in case of need is directly transferable to the consumer of the heating installation.

17 Claims, 1 Drawing Figure

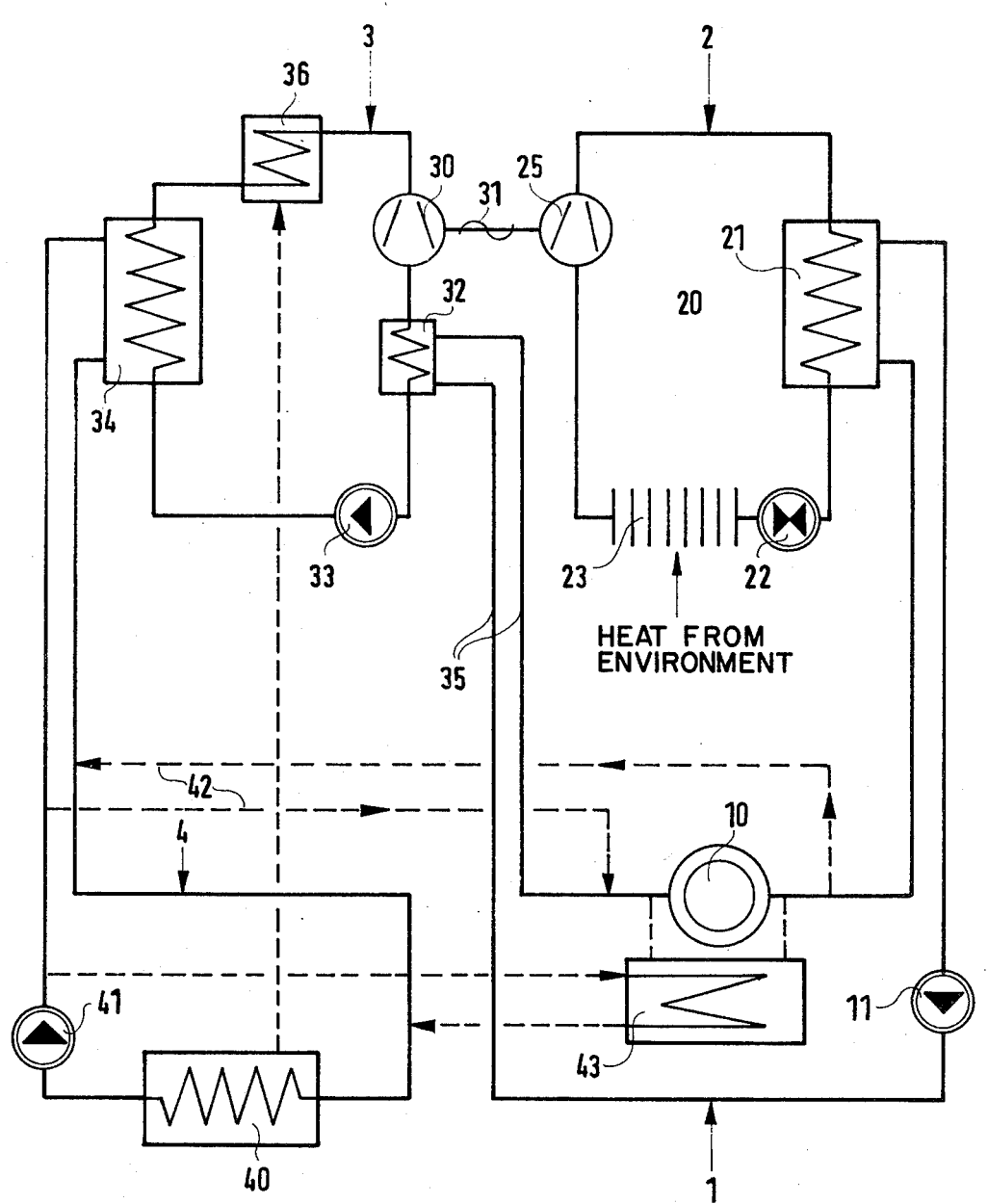

HEATING INSTALLATION

The invention relates to a heating installation comprising a first heat carrier, comprising a heat pump with a circulating second heat carrier, compressed by a compressor, for heating the first carrier, and further comprising a prime mover for driving the compressor, the prime mover in turn being impinged on by vapor from a third heat carrier guided in a closed circuit.

The increasing costs of primary energy necessitate better utilization of primary energy and use of different energy sources. One possibility is provided by the heat pump. By further cooling a relatively cool medium which is available in unlimited quantities, such as the outside air, ground water, water in a stream or cooling medium from a power station, this evaporates a (second) heat carrier circulating in the heat pump. For the second heat carrier to transmit heat to the first carrier of the installation under normal conditions, a further amount of heat must be supplied to the second carrier, and it is usually done by compressing a gas. The compressing energy is supplied by a compressor, which in known constructions is driven by an electric motor or internal combustion engine.

So long as such an electric motor is operated with current generated at a power station operating by condensation, on the basis of the known degree of efficiency of such stations only approximately ⅓ of the primary energy used is effectively exploited, while about ⅔ of the primary energy is lost to the environment of the power station, chiefly as condensation heat.

Relative to the temperatures during the year in question most heat pumps operate with an average performance index of 3. Thus with the heat pump driven by an electric motor virtually no primary energy is saved, so long as the current is largely generated in condensation type power stations. In purely residential areas limits are often set to the use of a heat pump driven by an electric motor, since the electrical network installed cannot supply any additional consuming appliances. Outputs of over 100 kWh are therefore seldom obtained.

Where the heat pump is driven with an internal combustion engine the primary energy may be utilized up to 170%. Internal combustion engines are relatively inexpensive, so long as they are derived from vehicle engines currently in production. Since, for reasons of durability and noise, output when driving a heat pump is lower than when operating in a vehicle, the maximum driving output obtainable with a derived vehicle engine is approximately 150 kWh. Higher outputs can be obtained only with very expensive large engines which have to be manufactured individually. In addition, the maintenance costs, wear, noise and vibration are disadvantageous when using internal combustion engines for driving heat pumps.

Since the prime movers of the heat pumps run at a maximum of 3000 rpm, high output compressors are correspondingly large. If small compressors are to be used for reasons of cost, the volumetric cooling capacity is a very important specific property of the coolant. Coolants which in themselves are thermodynamically superior can often not be used because their volumetric cooling capacity is sometimes more unfavorable.

There is therefore a need for a different prime mover for the compressor of a heat pump; it must guarantee better utilization of primary energy, be produced in quite large units but at low cost and must be operated as far as possible without any maintenance.

Experience has further shown that in medium degrees of latitude the quantity of heat given out by an economically operated heat pump is not generally quite sufficient to heat a building or factory on the few very cold days. However, since satisfactory heating of the building or factory must be ensured in all cases, an additional heating plant is necessary; the separate installation of a heat pump and an additional heating plant result in high installation costs.

In the light of the above-mentioned disadvantages and other disadvantages of prior art, the invention aims to provide an integrated, dual action heating installation, which firstly will operate with a heat pump and secondly can provide additional heat for particularly cold days; operating and maintenance costs must be reduced, and the installation must ensure better use of the primary energy required to operate the heat pump.

According to the invention this aim is achieved by a heating installation with the features set out in claim 1. Advantageous developments of this installation are contained in the subsidiary claims.

An essential feature of the invention is that the prime mover provided to drive the compressor is a turbine operated with a working medium (third heat carrier) which has a lower evaporation enthalpy than water. Furthermore, the condensation heat produced on condensation of the third heat carrier is supplied directly to the first heat carrier, discharging heat to the consuming device; this results in particularly good exploitation of primary energy. The use of an inexpensively produced turbine as the prime mover involves little maintenance even with permanent operation, and ensures a high degree of efficiency. Finally, such a turbine with the working medium provided according to the invention may be operated under low pressure conditions, thereby imposing less stringent safety requirements than the operation of a high pressure steam power plant.

The heat source for the heating installation according to the invention is large enough to cover the entire heat requirement if necessary. As it both supplies additional heat for particularly cold days and produces the energy required to operate the heat pump, the total installation costs are lower than those for other, non-integrated installations.

Further advantages and peculiarities of the invention will emerge from the following description of a preferred embodiment. The description refers to a drawing in the form of a block diagram, showing how the various heat carriers are conducted in the heating installation according to the invention.

As shown in the drawing, there are substantially four different heat carrier circuits in the installation according to the invention, namely the circuit 1 with the first heat carrier, through which the heat generated by the installation is supplied to the consuming device 10;

the circuit 2 with the second heat carrier, circulating in the heat pump 20;

the circuit 3 with the third heat carrier for operating the motor 30; and the circuit 4 with the fourth heat carrier, which supplies the heat generated in the source 40 both to the third heat carrier and, where required, to the first heat carrier.

The heat generated by the installation is supplied to the consuming device 10 by means of the circuit 1.

Examples of such consuming devices are the heaters in residential or business premises, the heating equipment for a manufacturing process or that for evaporators. In the circuit 1 the first heat carrier circulates in gaseous or liquid form. In the majority of cases the first heat carrier will be water; for special purposes it may equally consist of an oil or the like. An example of the circuit 1 is the hot water heating system in residential premises. The first heat carrier can further consist of air, guided e.g. in a closed circuit. Alternatively it may be air which is heated by the second heat carrier and thereupon blown into the rooms to be heated, with only some or none at all of the air being returned when the heat has been given out (air heating).

The first heat carrier is heated chiefly in the liquefier 21 belonging to the heat pump 20. The liquefier 21 may be in the usual form of a plate-type exchanger, tubular exchanger or the like. In addition the condensation heat produced in the condensor 32 is supplied to the heat carrier as will be explained below. Where necessary, heat from the source 40 is also supplied directly to the first carrier. For this purpose either part of the fourth heat carrier is fed directly into the circuit 1 or a heat exchange is provided in an exchanger 43, as explained in detail below. Finally, the circulating pump 11 or a fan may be provided in the circuit 1 to circulate the first heat carrier mechanically.

The circuit 2 corresponds to the cycle of the second heat carrier in the heat pump 20. The components and mode of operation of a heat pump are sufficiently well known, so will only be described briefly here; for more detailed descriptions the reader is referred e.g. to Recknagel-Sprenger, Handbook on Heating, Ventilation and Air Conditioning, 54th Edition, Pages 360–363 (1966).

The heat pump 20 is associated with the liquefier 21, the relief valve 22, the evaporator 23 and the compressor 25. The second heat carrier, circulating in the heat pump 20, transmits heat to the first heat carrier in the liquefier 21 and is then relieved in the valve 22; in the evaporator 23 heat is withdrawn from an external medium available in unlimited quantities, such as the outside air, water from a stream or ground water, to evaporate the second heat carrier. The vapor formed is compressed in the compressor 25. This brings the temperature of the second heat carrier to a level high enough to enable heat to be transmitted to the first carrier in the liquefier 21.

The choice of the second heat carrier is of considerable importance if the heat pump 20 is to operate efficiently. Suitable coolants are e.g. easily liquefiable gases such as carbon dioxide, ammonia or known coolants based on halogenated aliphatic hydrocarbons and mixtures thereof. Some examples of coolants are monochlorodifluoromethane ($CHClF_2$), dichlorodifluoromethane ($CCl_2F_2$), an azeotropically boiling mixture of monochlorodifluoromethane and monochloropentafluoroethane (48.8% b.w. $CHClF_2$ and 51.2% b.w. $C_2ClF_5$), dichlorotetrafluoroethane ($C_2Cl_2F_4$), trichlorofluoromethane ($CCl_3F$) or octafluorocyclobutane ($C_4F_8$). A low boiling coolant is understood as being a coolant of this type where the boiling point under normal pressure is preferably in the range from $-20°$ to $-30°$ C.

The prime mover 30 is provided to drive the compressor 25. It may be an expansion engine impinged on by the steam of the third heat carrier, such as a lifting piston or circling piston engine, or a screw compressor operating as a prime mover. It is preferable for the prime mover 30 to be a turbine coupled to the compressor 25 by a common shaft 31. The turbine may be constructed cheaply and operated substantially without any maintenance and with little wear. It supplies the high rotational speeds required to operate the compressor 25, without any additional gearing. The high driving speeds of the turbine enable the compressor coupled to it to have a small overall size, thereby reducing the production costs for the compressor and increasing its efficiency. Because of the high speeds and consequent small dimensions of the compressor, the volumetric cooling performance of the heat carrier used is of less importance, thus giving greater freedom in the choice of the heat carrier.

The turbine 30 is a component of the circuit 3 in which the third heat carrier is conducted. The circuit 3 also includes, downstream of the prime mover 30, the condenser 32, the feeding pump 33, the heat exchanger 34 and possibly the heat exchanger 36. In the heat exchanger 34 the hot fourth heat carrier coming from the heat source 40 transmits heat to the third carrier, supplied by the feeding pump 33, and evaporates it. The vapor of the third heat carrier impinges on the prime mover 30. On leaving the prime mover 30 the relieved vapor is condensed in the condenser 32. The additional heat exchanger 36 can further be provided between the exchanger 34 and the prime mover 30; this utilizes the residual heat of the fumes flying away from the heat source 40 to super heat the third carrier.

A further important feature of the invention is that the condensation heat produced in the condensor 32 is utilized effectively and applied to heat the first carrier directly; for this purpose the first heat carrier is guided positively through the pipes 35 by the condensor 32.

A further important feature of the invention concerns the choice of the third heat carrier. According to the invention the third heat carrier must be a low boiling coolant with a lower evaporation enthalpy than water. Some suitable coolants are easily liquefiable gases such as carbon dioxide, ammonia or sulphur dioxide or known coolants based on halogenated aliphatic hydrocarbons and mixtures thereof. The third heat carrier is preferably a coolant with a boiling point ranging from $-20°$ to $-30°$ C. at normal pressure; it is preferably trichlorofluoromethane ($CCl_3F$), dichlorodifluoromethane ($CCl_2F_2$), monochlorodifluoromethane ($CHClF_2$), dichlorotetrafluroethane ($C_2Cl_2F_4$) or octafluorocyclobutane ($C_4F_8$), dichlorotetrafluoroethane ($C_2Cl_2F_4$) being particularly preferred.

Further according to the invention, the third heat carrier and the second heat carrier must consist of the same coolant. If the evaporator 23 is operated at evaporating temperatures below or round about 0° C., it is preferable to use trichlorofluoromethane ($CCl_3F$) and octafluorocyclobutane ($C_4F_8$). If the evaporator 23 is operated at temperatures above 5° C. the most preferable substance is dichlorotetrafluoroethane ($C_2Cl_2F_4$). This has the particular advantage that, if there should be any leaks in the shaft seal between the housing components of the turbine and of the compressor, the second heat carrier cannot be changed in its physical properties by the third heat carrier.

In one embodiment, which is given as an example, the third heat carrier comprises octafluorocyclobutane ($C_4F_8$). It is heated to about 100° C. in the heat exchanger 34, compressed to a pressure of about 21 bars, super-heated to approximately 175° C. in the heat exchanger 36 and condensed at 60° C. in the condensor 32. The prime mover 30 consists of a single-stage or 2-stage turbine, similar to that of a turbo-supercharger, which revolves at approximately 10,000 to 20,000 revolutions per minute and drives the compressor 25 at the same speed.

On the basis of a net heat output of 100 kWh from a heat generator heated with oil, gas, coal or other combustible materials, the primary energy requirement with an 85% efficient boiler will be approximately 118 kWh. This does not take the energy for operating a burner or suction blower into account. The useful output at the turbine shaft, given a total efficiency of about 75% for the turbine and compressor, is approximately 34.5 kWh; the amount of condensation heat is approximately 54 kWh. Given a performance index of 3, the heat pump 20 can take in a further 69 kWh from the environment. In addition approximately 10 kWh can be brought into the circuit of the first heat carrier from losses from the turbine and compressor (oil cooler, polytropic relief) and about 6 kWh from the fumes. Thus 173.5 kWh are available to the consuming device 10 in the circuit. Approximately 1.5 kWh have to be added to the primary energy requirement for driving the feeding pump 33. The additional energy obtained by the process is thus 55 kWh or approximately 45%.

The heat exchanger 34 is connected to the circuit 4 in which the fourth heat carrier is conducted. Other components of the circuit 4 are the heat source 40 and possibly the circulating pump 41, although this is not required if the heat source 40 is a steam generator. The heat source 40 may be a conventional boiler heated by oil, gas or a solid fuel and adapted to different outputs. Altogether the heat source 40 is designed to supply the total heat requirement of the consuming device 10. Under normal conditions the heat pump 2 must contribute towards covering this heat requirement and withdraw a corresponding amount of heat from the external environment, so that the heat source 40 has to provide a correspondingly reduced amount of heat. Under good weather conditions, finally, the heat pump 20 can cover the entire heat requirement of the consuming device 10, so that in this case the heat source 40 need only provide sufficient heat to evaporate the third heat carrier. The burning period of the heat source 40 is preferably adapted to these requirements, with the corresponding signals being detected by temperature sensers, thermostats and/or other controls.

The fourth heat carrier travelling round the circuit 4 is preferably low pressure vapor or a liquid such as water.

It will be appreciated that the main function of the circuit 4 and heat source 40 is to supply the heat exchanger 34 with the heat required to evaporate the third heat carrier. If other sources of heat should be available for this purpose the source 40 and circulating pump 41 may be dispensed with and the heat exchanger 34 heated directly by these other heat carriers, e.g. by heat from a remote heating network or waste heat from a different process. If the temperature level of such an external heat source should not be high enough for the required super heating of the third heat carrier, additional super heating may take place in the heat exchanger 36 with an additional source, e.g. electric current.

In an alternative embodiment of the heating installation according to the invention, the quantity of heat made available by the heat pump 20 in the liquefier 21, for heating the first heat carrier, may be used to evaporate an additional coolant circulating in an additional, interpolated heat pump. The additional coolant is relieved by a further turbine similar to the turbine 30. The additional turbine drives an additional compressor, similar to the compressor 25, which is seated on a common shaft and forms the compressor for the additional interpolated heat pump. Only in the liquefier of the additional interpolated heat pump is the heat finally transmitted to the circuit 1 leading to the consuming device; that is to say, in this alternative embodiment the heat of the second carrier for heating the first carrier is transmitted through the additional interpolated heat pump. The condensation heat of the additional turbine may equally be supplied to the first carrier. In this alternative embodiment the proportion of conversion to mechanical energy may be further increased over that in the embodiment described above, allowing for still better exploitation of the primary energy.

Further according to the invention, direct transmission of heat from the circuit 4 to the circuit 1 is provided for, should this be necessitated by the increased heat requirement of the consuming device 10 on particularly cold days. If the fourth carrier and the first carrier consist of the same fluid, e.g. water, a forward and return conduit 42 may be provided for the purpose, through which part of the hot fluid from the circuit 4 is fed directly into the circuit 1. Under special conditions consideration may also be given to stopping the two circuits 2 and 3 and introducing all the heat transmitted from the source 40 directly to the circuit 1 through the circuit 4 and forward and return conduit 42. In cases where the first and fourth heat carriers are not the same, and/or the pressures in the first and fourth circuits do not match one another, a heat exchanger 43 should desirably be provided to transmit heat to the first carrier. The heat exchanger 43 would then be supplied both with the hot fourth carrier from the circuit 4 and the first carrier from the circuit 1.

I claim:

1. A heating installation comprising a first circuit with a first heat carrier, a second circuit for heating the first heat carrier and with a second heat carrier in the form of a low boiling coolant, said second circuit comprising a heat pump and a compressor, a prime mover for driving said compressor, a third circuit with a third heat carrier for driving said prime mover, a fourth circuit with a fourth heat carrier heatable by a heat source and for heating said third heat carrier, said second and third heat carriers being separated from each other, an evaporator provided in said second circuit, said evaporator being feedable with heat from the environment, and means adapted to establish direct heat exchange between said first and fourth heat carriers.

2. The installation of claim 1, wherein the second heat carrier is the same as the third.

3. The installation of claim 1, wherein the second and/or third heat carrier is trichlorofluoromethane ($CCl_3F$), dichlorodifluoromethane ($CCl_2F_2$), chlorodifluoromethane ($CHClF_2$), dichlorotetrafluoroethane ($C_2Cl_2F_4$) or octafluorocyclobutane ($C_4F_8$).

4. The installation of claim 2, wherein the second and third heat carrier is trichlorofluoromethane ($CCl_3F$), dichlorodifluoromethane ($CCl_2F_2$), chlorodifluoromethane ($CHClF_2$), dichlorotetrafluoroethane ($C_2Cl_2F_4$) or octafluorocyclobutane ($C_4F_8$).

5. The installation of claim 3, wherein for operating of the evaporator of the heat pump at an evaporating temperature of 0° C. or below, the second and/or third heat carrier is octafluorocyclobutane ($C_4F_8$).

6. The installation of claim 4, wherein for operation of the evaporator of the heat pump at an evaporating temperature of 0° C. or below, the second and third heat carrier is octafluorocyclobutane ($C_4F_8$).

7. The installation of claim 3, wherein for operation of the evaporator of the heat pump at an evaporating temperature above +5° C., the second and/or third heat carrier is dichlorotetrafluoroethane ($C_2Cl_2F_4$).

8. The installation of claim 4, wherein for operation of the evaporator of the heat pump at an evaporating temperature above +5° C., the second and third heat carrier is dichlorotetrafluoroethane ($C_2Cl_2F_4$).

9. The installation of claim 1, wherein the prime mover is a turbine.

10. The installation of claim 9, wherein the turbine and compressor are seated on a common shaft.

11. The installation of claim 9, comprising means for supplying the condensation heat of the third heat carrier directly to the first heat carrier.

12. The installation of claim 1, wherein the heat source for the fourth heat carrier is large enough to operate the heating installation alone.

13. The installation of claim 1, including means for supplying residual warmth from the heat source or warmth from an external heat source to the third heat carrier.

14. The installation of claim 1, including a heat exchanger for transmitting heat from the fourth heat carrier to the first carrier.

15. The installation of claim 1, comprising an additional interpolated heat pump for transmitting the heat from the second carrier to the first carrier.

16. The installation of claim 15, wherein said additional interpolated heat pump has a compressor driven by an additional turbine.

17. The installation of claim 15, including means for supplying the condensation heat of the additional turbine to the first heat carrier.

* * * * *